US012580955B2

(12) United States Patent
Chesla et al.

(10) Patent No.: US 12,580,955 B2
(45) Date of Patent: Mar. 17, 2026

(54) METHOD AND SYSTEM FOR CHARACTERIZATION AND MITIGATION OF ENCRYPTED DISTRIBUTED DENIAL OF SERVICE (DDoS) ATTACKS

(71) Applicant: Radware Ltd., Tel Aviv (IL)

(72) Inventors: Avi Chesla, Tel Aviv (IL); Guy Perez, Yavne (IL)

(73) Assignee: Radware Ltd., Tel Aviv (IL)

( * ) Notice: Subject to any disclaimer, the term of this patent is extended or adjusted under 35 U.S.C. 154(b) by 0 days.

(21) Appl. No.: 18/819,308

(22) Filed: Aug. 29, 2024

(65) Prior Publication Data

US 2026/0067327 A1     Mar. 5, 2026

(51) Int. Cl.
H04L 9/40          (2022.01)

(52) U.S. Cl.
CPC ...... *H04L 63/1458* (2013.01); *H04L 63/1416* (2013.01)

(58) Field of Classification Search
CPC .................................................. H04L 63/1458
See application file for complete search history.

(56) References Cited

U.S. PATENT DOCUMENTS

| | | | |
|---|---|---|---|
| 11,363,044 B2 | 6/2022 | Doron et al. | |
| 11,405,418 B2 | 8/2022 | Yarabolu | |
| 11,563,772 B2 | 1/2023 | Doron et al. | |
| 2013/0254879 A1* | 9/2013 | Chesla | H04L 63/1425 726/22 |
| 2017/0070531 A1 | 3/2017 | Huston, III et al. | |
| 2020/0412750 A1* | 12/2020 | Doron | H04L 63/1425 |
| 2021/0099482 A1* | 4/2021 | Doron | H04L 43/062 |
| 2021/0120015 A1 | 4/2021 | Rajaram et al. | |
| 2021/0152526 A1 | 5/2021 | Kohout et al. | |
| 2021/0194903 A1* | 6/2021 | Medvedovsky | H04L 63/1416 |
| 2022/0294814 A1 | 9/2022 | Doron et al. | |

* cited by examiner

*Primary Examiner* — Bradley W Holder
(74) *Attorney, Agent, or Firm* — M&B IP Analysts, LLC

(57)          ABSTRACT
A method and system for mitigating encrypted distributed denial of service (DDOS) attacks comprising: receiving a detection of an encrypted DDOS attack from an encrypted transaction related traffic, wherein the encrypted DDOS attack is associated with a plurality of transport layer security (TLS) fingerprints (FPs); classifying each of the plurality of TLS FPs as a type of FP based on a comparison of rate-invariant values to a native FP baseline, wherein the rate-invariant values are associated with the plurality of TLS FPs; selecting anomalous FPs as a subset of the plurality of TLS FPs; generating a real time signature (RTS), for the encrypted DDOS attack, having at least one unknown type of FP of the subset of anomalous FPs; and mitigating the encrypted DDOS attack based on the generated RTS.

20 Claims, 6 Drawing Sheets

METHOD AND SYSTEM FOR CHARACTERIZATION AND MITIGATION OF ENCRYPTED DISTRIBUTED DENIAL OF SERVICE (DDoS) ATTACKS

TECHNICAL FIELD

The present disclosure relates generally to the detection of malicious cyberattacks and, more specifically, to the characterization and mitigation of encrypted TLS DDOS attacks without decryption.

BACKGROUND

Denial of service (DOS) and distributed denial of service (DDOS) attacks are types of cyberattacks where attackers overload a target computer, a network infrastructure, a server, or a system with access requests, to the point where the target computer becomes unable to fulfill its intended purpose.

DOS/DDOS attacks (hereinafter collectively referred to as DDOS attacks) can potentially be performed on the network layer, e.g., using the TCP/UDP/Internet Protocol (IP) layer, or on various application layers, e.g., using HTTP/S layer. For example, a common type of DDOS attack, the SYN flood, abuses TCP protocol behaviors, relying on the protocol's established "handshake" routine. In such attacks, the attackers flood the target with requests to synchronize, receiving the target's acknowledgment (ack) and refusing to send the second acknowledgment the target expects, leaving the pattern incomplete, depleting the target resources, and locking out legitimate users.

Transport layer security (TLS) encrypt-led attacks are quite common nowadays. These attacks can be distributed to hundreds of thousands of targets at a very high request rate, ranging from a few hundred to tens of millions of requests per second and/or a very high rate of TLS handshakes as well as an effective attack vector that floods the TLS computer resources (even if the request rate is low).

Detecting TLS-encrypted attacks can be highly complex because of the specific characteristics of these attacks. One such characteristic is the time it takes to reach the attack rate, which is typically less than 10 seconds and can be a steep climb. Another characteristic is the ratio between the TLS handshake and the number of web requests. This ratio can be either 1-to-1 or 1-to-N. In a 1-to-1 ratio, the TLS handshake rate accurately characterizes the requests' load. In a 1-to-N ratio, multiple requests are generated within the same TCP connection or even within one packet.

Further, modern attack tools have evolved to generate transactions that mimic normal traffic patterns to evade detection and mitigation methods. To achieve this, attackers may comply with the protocols' RFCs, randomize the content of requests, and use web client engines that can respond to web challenges. These deceptive techniques make existing DDOS detection and mitigation methods ineffective as they rely on finding consistent attack patterns and/or challenge-response verification methods.

Further, entities like financial services firms, government organizations, and others refrain from sharing their TLS certificates due to privacy reasons. This makes existing detection and mitigation techniques that rely on analyzing the clear text data ineffective.

In addition, TLS termination requires significant usage of compute resources, which increases significantly during encrypted Web DDOS attacks, thereby resulting in a highly expensive defense system.

Accordingly, an efficient method and system for mitigating encrypted TLS DDOS attacks is desired.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" or "one aspect" or "some aspects" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, a method for mitigating encrypted distributed denial of service (DDOS) attacks may include: receiving a detection of an encrypted DDOS attack from an encrypted transaction related traffic, wherein the encrypted DDOS attack is associated with a plurality of transport layer security (TLS) fingerprints (FPs); classifying each of the plurality of TLS FPs as a type of FP based on a comparison of rate-invariant values to a native FP baseline, wherein the rate-invariant values are associated with the plurality of TLS FPs; selecting anomalous FPs as a subset of the plurality of TLS FPs; generating a real time signature (RTS), for the encrypted DDOS attack, having at least one unknown type of FP of the subset of anomalous FPs; and mitigating the encrypted DDOS attack based on the generated RTS. Other embodiments of this aspect include corresponding computer systems, apparatus, and computer programs recorded on one or more computer storage devices, each configured to perform the actions of the methods.

In one general aspect, disclosed herein also include a non-transitory computer readable medium having stored thereon instructions for causing a processing circuitry to execute a process, the process comprising: receiving a detection of an encrypted DDOS attack from an encrypted transaction related traffic, wherein the encrypted DDOS attack is associated with a plurality of transport layer security (TLS) fingerprints (FPs); classifying each of the plurality of TLS FPs as a type of FP based on a comparison of rate-invariant values to a native FP baseline, wherein the rate-invariant values are associated with the plurality of TLS FPs; selecting anomalous FPs as a subset of the plurality of TLS FPs; generating a real time signature (RTS), for the encrypted DDOS attack, having at least one unknown type of FP of the subset of anomalous FPs; and mitigating the encrypted DDOS attack based on the generated RTS. Other embodiments of this aspect include corresponding computer systems, apparatus, and computer programs recorded on one or more computer storage devices, each configured to perform the actions of the methods.

In one general aspect, a system may include one or more processing circuitry, and a memory, the memory containing instructions that, when executed by the processing circuitry, configure the system to: receive a detection of an encrypted DDOS attack from an encrypted transaction related traffic, wherein the encrypted DDOS attack is associated with a plurality of transport layer security (TLS) fingerprints (FPs); classify each of the plurality of TLS FPs as a type of FP based on a comparison of rate-invariant values to a native FP baseline, wherein the rate-invariant values are associated with the plurality of TLS FPs; select anomalous FPs as a subset of the plurality of TLS FPs; generate a real time signature (RTS), for the encrypted DDOS attack, having at least one unknown type of FP of the subset of anomalous FPs; and mitigate the encrypted DDOS attack based on the generated RTS. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
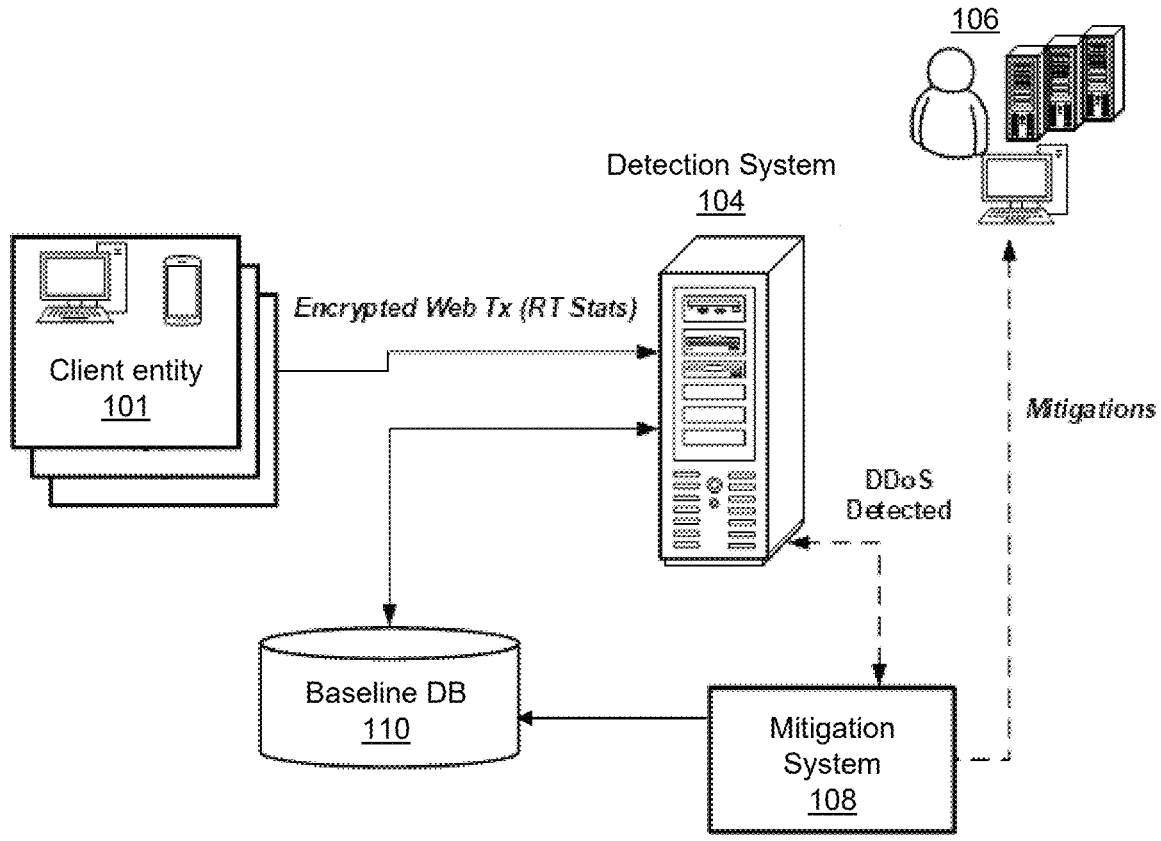
FIG. 1 is a schematic diagram explaining an environment for detecting distributed denial of service (DDOS) attacks represented by encrypted TLS DDOS attacks based on real-time statistics according to an embodiment.

It is important to note that the embodiments disclosed herein are only examples of the many advantageous uses of the innovative teachings. In general, statements made in the specification of the present application do not necessarily limit any of the various claimed embodiments. Moreover, some statements may apply to some inventive features but not others. In general, unless otherwise indicated, singular elements may be in plural and vice versa with no loss of generality. In the drawings, like numerals refer to like parts through several views.

According to the disclosed embodiments, a method and system for characterizing and mitigating encrypted transport layer security (TLS) DDOS attacks based on real-time statistics without decryption, is provided. An encrypted TLS DDOS attack combines two elements: the use of TLS encryption and the malicious intent of a DDOS attack. An encrypted TLS DDOS attack involves launching a DDOS attack against a target while encrypting the malicious traffic using the TLS protocol. This means that the attacker uses TLS encryption to hide the nature and content of the malicious traffic, making it more challenging for security systems to detect and mitigate the attack. An encrypted TLS DDOS attack can exploit any communication protocol utilizing TLS. Such communication protocols may include File Transfer Protocol Secure (FTPs), Simple Mail Transfer Protocol Secure (SMTPs), Hypertext Transfer Protocol Secure (HTTPS), Datagram Transport Layer Security DTLS, and the like. That is, an encrypted TLS DDOS attack is not limited to web traffic but also targets other servers, services, applications, and the like receiving traffic encrypted using TLS.

In one embodiment, characterization of encrypted TLS DDOS attack is achieved through behavioral analysis relative to normal baselines for at least one of rate-based and rate-invariant parameters, as well as normal baselines for TLS fingerprints, and detecting any deviations from these baselines that may identify the TLS fingerprints and define a type of an encrypted TLS DDOS attack. The normal baselines are based on a normal behavior of the protected entity. The disclosed embodiments provide a technical improvement over current solutions since no TLS certificate is required. Therefore, no decryption is necessary, which results in saving on compute resources, faster detection, as well as preserving a robust level of data privacy.

The embodiments, disclosed herein, provide a system and method to mitigate encrypted TLS DDOS attacks using a real-time signature (RTS). During a characterization phase, the signature (i.e., RTS) is automatically generated based on TLS fingerprints and parameters derived from the TCP/IP and TLS transportation and session layers or a combination of both. The signature identifies certain TLS fingerprints with potentially malicious intent of a DDOS attack out of all traffic communicated over the TLS communication protocol. To this end, targeted identification and mitigation may be performed for effective mitigation without disrupting the entire communication traffic, including the legitimate and necessary communications.

More particularly, the behavioral analysis using at least one of the rate-based and rate-invariant parameters, disclosed herein, enables efficient discovery of the potentially malicious TLS fingerprints. Each and groups of TLS fingerprints are classified as a type of fingerprint in order to select and resolve make up of the signature. In an example embodiment, classified trusted TLS fingerprints may be excluded altogether, whereas other TLS fingerprints may be discovered as potentially malicious and added to the signature. Moreover, the classification of fingerprints enhances visibility into the TLS DDOS attack traffic to reduce false positives, all without decryption of the attack, reducing processing complexity and time. It should be appreciated that such rapid discovery of the attack and malicious portions thereof is advantageous, particularly for the short-lived TLS encrypted attacks.

FIG. 1 is a schematic diagram explaining an environment for detecting, characterizing, and mitigating encrypted TLS distributed denial of service (DDoS) attacks according to an embodiment.

Client entities 101 may be a WEB browser or another type of WEB application client or user agent, and the like, executing over a computing device, such as a server, a mobile device, an IoT device, a laptop, a PC, a connected device, a smart TV system and the like, and any combination thereof. A client entity 101 may be a legitimate client device or an attack tool. Such attack tools carry out malicious TLS DDOS attacks against a victim protected entity 106.

A detection system 104 is a node, a system, a server, or any other facilitator(s) configured to run the process to detect the encrypted TLS DDOS attacks. The detection system 104 is further configured to learn and update normal baselines for both rate-based and rate-invariant parameters. The normal baselines are stored in the baseline database (DB) 110 and may be updated, for example, intermittently, at preconfigured intervals, on demand, or the like. As an example, the baseline may be updated on an hourly basis. The normal baselines may be updated by learning the transactions in a time window at peacetime, i.e., without anomalies or potential attacks.

The detection system 104 is configured to detect the encrypted DDOS attacks by analyzing real-time traffic received from client entities 101 directed to protected entities 106 and comparing the analyzed traffic to rate-based and rate-invariant thresholds to identify anomalies in the traffic. The thresholds are computed based on the learned baselines. A detected traffic anomaly may be indicative of an encrypted TLS DDOS attack. In an embodiment, an encrypted TLS DDOS attack is declared when rate-based and rate-invariant anomalies are detected. A non-limiting example of a system and method for detecting encrypted TLS DDOS attack is described in more detail in U.S. application Ser. No. 18/400, 391 to Chesla et al. assigned to the common assignee, the contents of which are hereby incorporated by reference.

The detection system 104 is configured to inspect only ingress traffic from client entities 101 to the protected entities 106. In such a configuration, the detection system 104 may inspect only incoming requests and effectively detect and mitigate encrypted DDOS attacks.

Once the encrypted TLS DDOS is detected, a mitigation system 108 is notified so the mitigation actions may be executed to protect the entities 106. A protected entity 106 may include a server, an application, a service, and the like. In particular, the protected entities 106 may represent a web host implemented on a server cluster that may be local or reside on a cloud.

According to the disclosed embodiments, the mitigation system 108 is configured to perform mitigation actions on the detected TLS DDOS attack based on a real time signature (RTS). The TLS DDOS attack involves a plurality of TLS fingerprints (FPs) and a subset of the TLS FPs from the plurality of FPs may be determined to be included in the RTS. The RTS includes at least one TLS FP (or SSL/TLS fingerprints) that is a unique identifier generated from a characteristic TLS handshake process between a client entity 101 (e.g., benign and/or malicious entity) and the protected entity 106 during a secure communication session. In particular, the RTS includes selective anomalous FPs that are determined with priority (e.g., greater weight) to unknown FPs as potentially malicious FPs, as described further herein below. The plurality of TLS FPs are classified as unknown FPs or known FPs according to the disclosed embodiments.

In an embodiment, the TLS FPs are represented as FP values such as, but not limited to, a numerical descriptor, a vector, a matrix, or the like, that are unique for each FP. In an embodiment, the mitigation action may be performed on the identified subset of FPs in the RTS. The RTS may be updated continuously or intermittently for effective mitigation of the TLS DDOS attack. In some implementations, the RTS is updated with changes in the attack characterization and/or composition of the attack.

The mitigation system 108 may perform one or more mitigation actions to mitigate the detected attack. The mitigation system 108 may be, for example, a scrubbing center or a DDOS mitigation device. A mitigation action may be, for example, but is not limited to, a simple blocking of the requests, filtering transactions based on hypertext transfer protocol (HTTP) header parameters, redirecting transactions, replying with an application challenge, or the like. It should be noted that one or more of the example mitigation actions described herein may decrypted for mitigation, i.e., SSL/TLS termination. The mitigation action may be performed according to a mitigation policy. In another example, the mitigation action may involve sending an alert to a protected entity (e.g., the protected entity 106, FIG. 1) or a user device associated with the protected entity of the attack and related information. As noted above, the mitigation action may be activated on a real-time signature (and the subset of FPs of the RTS) of the attack. Further, the generated signatures may be utilized to update a mitigation policy defined in the mitigation system 108.

In an embodiment, the mitigation system 108 is configured to classify the plurality of FPs in the TLS DDOS attack for generation of the RTS. Each of the plurality of FPs in the TLS attack may be identified as known or unknown FPs based on real-time statistics such as, but not limited to, rate-based parameters and/or rate-invariant parameters derived for the respective FPs in the attack time window. The attack time window is a preconfigured time and includes traffic such as, for example, but not limited to, transactions, packets, or the like, that are encrypted using the TLS protocol. The classified known FPs and unknown FPs are utilized to determine potentially malicious FPs and added to the RTS of the detected encrypted DDOS attack, for remediation of the attack without decryption.

In an embodiment, the known FPs and the unknown FPs are classified based on a comparison with baselines that represent peacetime traffic, when no attack is detected, using rate-based and rate-invariant parameters. The baselines (e.g., normal baselines, native FP baselines, or the like) provide the distribution of FPs and their real-time statistics in absence of a DDOS attack. The native FP baseline includes selective FPs of the normal baseline that qualify as native FPs for having probabilities greater than a native probability threshold value. In an example embodiment, the native FPs are frequently detected during legitimate traffic and are estimated to constitute at least 5% of the traffic in the time window. The baselines may be stored and retrieved from a baseline DB 110, FIG. 1. In some embodiments, the known FPs are the native FPs, and the unknown FPs are FPs of the attack that are missing in the native FP baseline.

According to the disclosed embodiments, the subset of the unknown and anomalous FPs is identified and added to the RTS. The unknown FPs may be new FPs, not part of the baseline, or previously seen FPs that are included in the baseline but have a lower number and/or rate of transactions, for example below a native threshold value. It should be noted that such unknown FPs may be effectively identified as potential targets for mitigation, thereby reducing processing time and energy.

The known FPs are FPs that were routinely monitored during peacetime traffic when no attack is detected and stored as part of the baselines. In an embodiment, the known FPs are regularly observed during peacetime traffic at probabilities equal to or greater than the native probability threshold value. Here, the known FPs are the native FPs in the native FP baseline. In some implementations, the known FPs are initially excluded as a potential RTS candidate to reduce the blocking of legitimate traffics to the protected entity 106.

It should be noted that a traffic includes, for example, but not limited to, transactions, packets, or the like, that are not mitigated, may be permitted to move forward to the protected entity 106 without disruption. The characterization and mitigation based on such characterization enable effective mitigations of malicious client entities without decryption and/or disruption. To this end, the disclosed embodiments reduce the computing burden and improve computational efficiency.

In some configurations, mitigation and classifications of the attack may be performed in the same mitigation system 108. In other configurations, the classifications, including characterization, of the attack may be performed in a separate system connected to the detection system 104 and the mitigation system 108, where the rate-based and rate-invariant parameter values of the FPs at baselines are accessible to the mitigation system 108.

In some configurations, the detection system 104, the mitigation system 108, and/or the protected entities 106 may be deployed in a cloud computing platform and/or in an on-premises deployment, such that they collocate together, or in a combination. The cloud computing platform may be but is not limited to, a public cloud, a private cloud, or a hybrid cloud. Examples of cloud computing platforms include Amazon® Web Services (AWS), Cisco® Metacloud, Microsoft® Azure®, Google® Cloud Platform, and the like. In other configurations, the deployment shown in FIG. 1 may include a content delivery network (CDN) connected between client entities 101 and protected entities 106.

It should be noted that although one detection system and mitigation system are depicted in FIG. 1, merely for the sake of simplicity, the embodiments disclosed herein can be applied to a plurality of detection systems and/or mitigation systems for protecting multiple geographically distributed protected entities 106, clients, and servers.

According to the disclosed embodiments, real-time statistics on rate-based and rate-invariant parameters are derived from traffic directed to the protected entities 106 (e.g., the attack traffic). It should be noted that such traffic includes transactions or packets encrypted using the TLS protocol. The real-time statistics are compared to the rate-based and rate-invariant thresholds, and when both thresholds are crossed, an attack is detected. The comparison is performed at each time window based on transactions (traffic) received during the time window.

Figure 2:
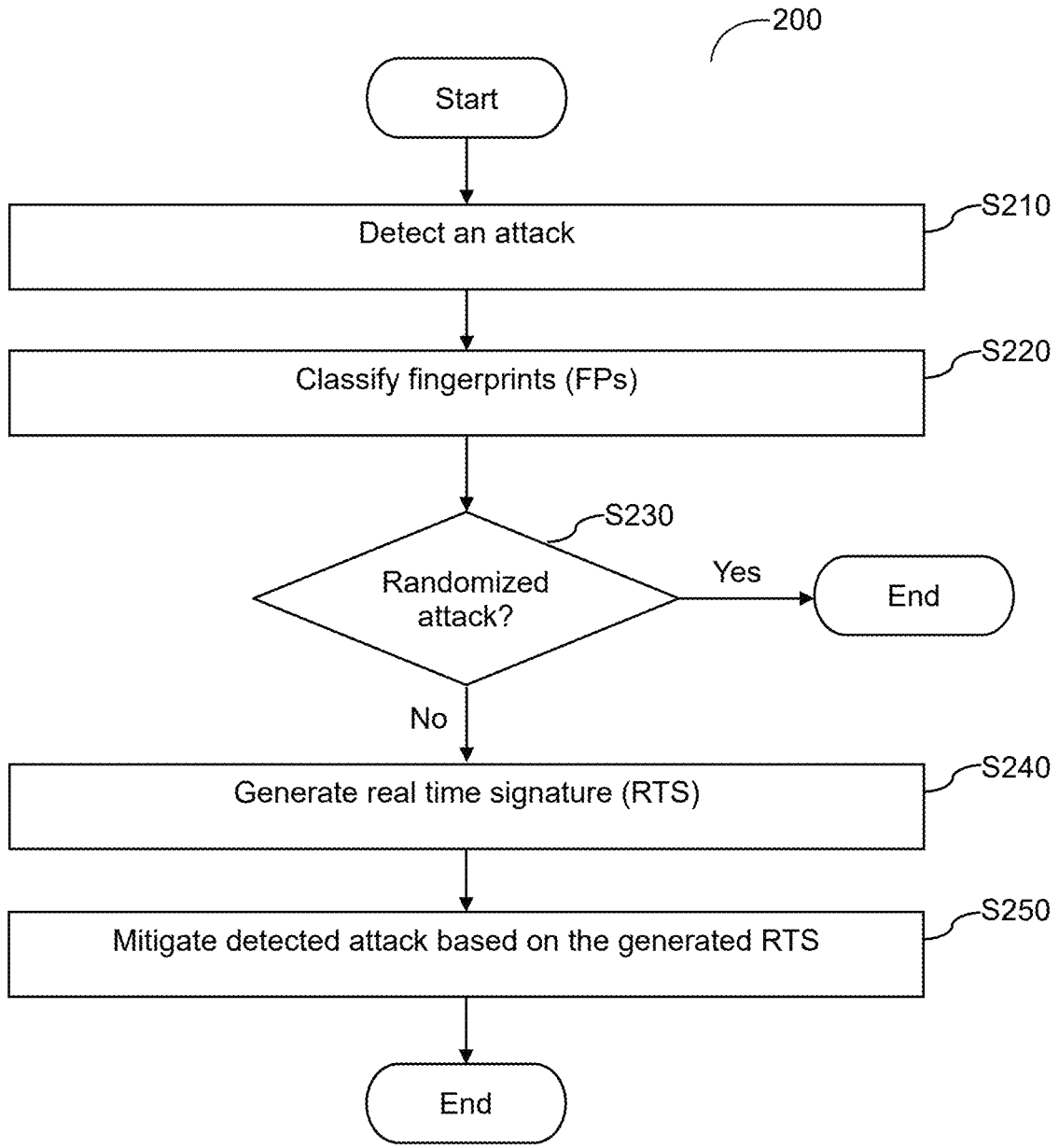
FIG. 2 is a flowchart illustrating a method for characterizing and mitigating encrypted TLS DDOS attacks according to an embodiment.

FIG. 2 illustrates an example flowchart 200 illustrating a method for characterizing and mitigating encrypted TLS DDOS attacks according to the disclosed embodiments. The method described herein is performed at the mitigation system 108, FIG. 1.

At S210, an encrypted TLS DDOS attack is detected. The attack is detected by receiving a notification from a detection system (e.g., the detection system 104, FIG. 1). The detection system provides information about the detected attack including, but not limited to, real-time statistics of the detected attack. In an embodiment, the attack is detected for transactions received from ingress traffic sent from a client to a protected entity (e.g., the protected entity 106, FIG. 1) during a time window. The transactions include, for example, but not limited to, packets, messages, signals, and the like encrypted using TLS. The time window may be preconfigured to a time period, for example, 10 seconds. In some embodiments, the real-time statistics are determined upon receiving detection of the TLS DDOS attack.

The real-time statistics of the TLS attack may include values for rate-based and rate-invariant parameters determined for TLS fingerprints (FPs) of the attack. In an example embodiment, the rate-based and rate-invariant parameter values are determined for each of the specific TLS FPs of the attack. A TLS fingerprint (FP), often referred to as a TLS handshake fingerprint or SSL/TLS fingerprint, is a unique identifier generated from the characteristics of the TLS handshake process between a client and a server during a secure communication session. An FP often represents the TLS library and configuration that the client application uses.

The rate-based parameters may include an FP hits rate, an FP load rate, and the total of FP hits and the total FP load toward a protected entity (e.g., the protected entity 106, FIG. 1). A rate-invariant parameter may include a probability distribution function (PDF) of the FP hits and FP load. That is, a rate-invariant parameter may include a PDF of a group of or all FPs derived from encrypted TLS transactions sent to the protected entity. The FP hits rate represents the total number of TLS handshakes per second. The FP load rate represents an estimated number of application requests, or data uploaded, per second. In an example embodiment, the FP load rate is evaluated based on the number of bytes marked with TLS content type 23 (Application Data) associated FP. The total FP hit is the total number of TLS handshakes during a time window toward a protected entity (e.g., a website, FTP site, based on IP address, server name indication (SNI), etc.). The total FP load represents the estimated number of application requests (i.e., transactions rate) or data received during a time window. The PDF of FPs may be defined as probability counter values for all FPs observed in the attack traffic. The counter is for known and unknown FP hits rate and FP load rate. The counter values may be associated with a time stamp.

In an example embodiment, a probability distribution function (PDF) for all of the FPs in the detected attack (or simply, "attack PDF") is compared to the PDF of all FPs in peacetime (i.e., normal PDF baseline) to determine the deviation of portions or all FPs from the peacetime, normal baseline. The PDF is a rate-invariant parameter that describes the estimated probability of appearances of all FPs within the time period that is, for example, represented as a vector of FPs probability values. In another example embodiment, the comparison is performed between the total variation of the attack PDF and the baseline PDF At S220, the TLS fingerprints (FPs) of the detected attack are classified. The detected attack includes a plurality of unique TLS fingerprints during the attack time period. The rate-based and the rate-invariant parameters of the plurality of FPs of TLS fingerprints are determined and compared to predetermined threshold values and/or baselines in order to classify the plurality of FPs as unknown FPs or known FPs. Such classification allows for evaluating the level of potential false positives that would take place during the attack mitigation.

In an embodiment, the distribution of rate-invariant parameters (e.g., the probability distribution function (PDF)) of the FPs are compared to a native FP baseline to classify portions of the plurality of FPs of the TLS attack as at least one of: known FPs and unknown FPs. In particular, TLS FPs in the native FP baseline are identified as "known FPs" and the TLS FPs not in (i.e., missing from) the native FP baseline are identified as "unknown FPs." The FPs classified as known FPs, from the detected attack, have characteristic FPs that were observed during peacetime and identified as native FPs. The native FP baseline is a distribution of native FPs that are observed and analyzed during peacetime when no attack is detected, and have probability values above a predefined native threshold value, for example, 0.05, 0.01, or the like.

That is, the known FPs are fingerprints (FPs) that may be frequently observed during peacetime traffic and included in the normal baseline and the native FP baseline. The unknown FPs may include FPs that are also observed during peacetime traffic, but at a low RI value, for example, below a predefined native probability threshold value, and do not qualify to be labeled as the known FPs. As an example, the unknown FPs have RI (e.g., PDF) values below 0.05, the predefined native probability threshold value. The unknown FPs may also include new FPs that were not observed during peacetime traffic.

The native FP baseline is derived from a normal baseline including fingerprints observed in a peacetime traffic when no attack (or anomaly) is detected. The native FP baseline provides a distribution and probabilities of native FPs that have probability values above the predefined native threshold value. The native FP baseline and the normal baseline are derived from peacetime traffic at a preconfigured time period (e.g., 10 seconds), for example, by a detection system (e.g., the detection system 104, FIG. 1) and are stored in a database (e.g., the baseline DB 110, FIG. 1). The real-time statistics of the transactions within the time period are analyzed to determine the baselines. The normal baseline and/or the native FPs baseline may be updated at preconfigured time intervals, for example, every 1 hour. In some implementations, the classification of known FPs and unknown FPs is determined based on the normal baseline. In an example embodiment, the plurality of FPs may be grouped based on the classification as, for example, an unknown FP portion, a known FP portion, and more.

In some embodiments, the native FP baseline is generated in parallel with the process of FIG. 2 based on the stored baseline and a changed native threshold value. As an example, a new native FP baseline is generated with a lower native threshold value to include a greater number of FPs as part of the native FP baseline. That is, the number of native FPs (i.e., known FPs) may be increased by lowering the native threshold value for generating the native FP baseline. It should be noted that the larger native FPs pool by the lower threshold value reduces the potential blocking of legitimate transactions.

Figure 3:
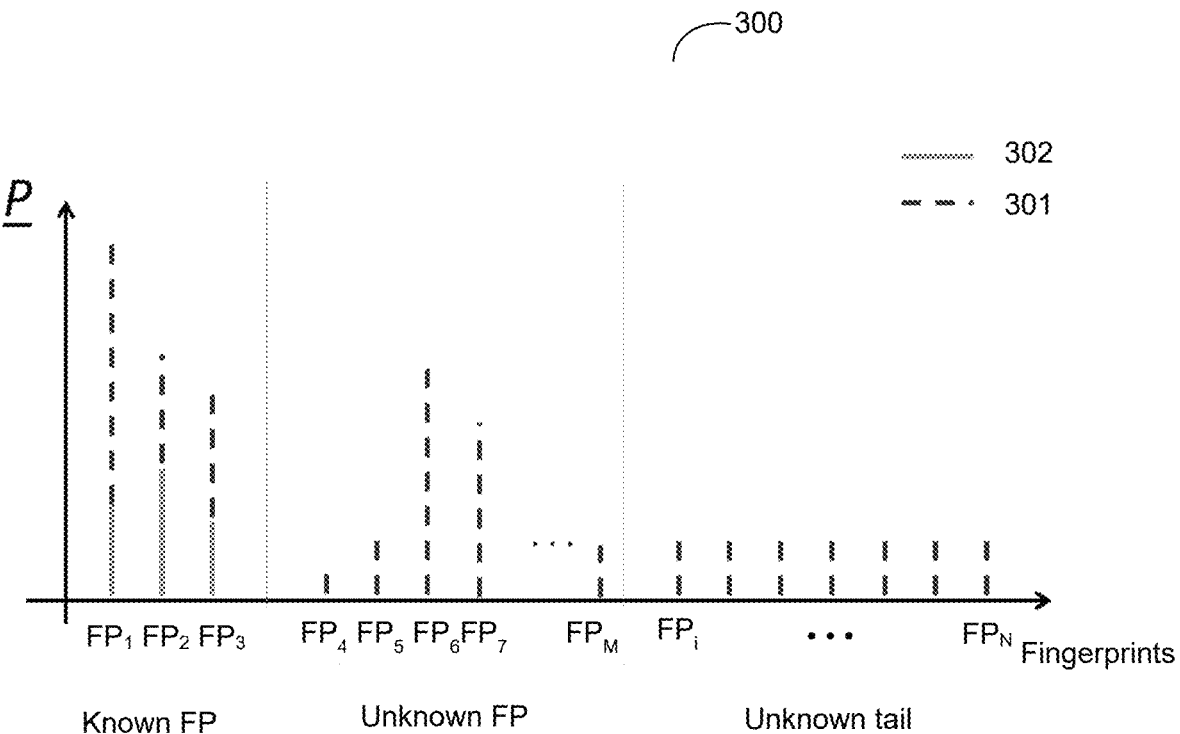
FIG. 3 is a plot illustrating a distribution of a plurality of fingerprints and their probabilities determined for a detected attack and an applied baseline according to an example embodiment.

FIG. 3 shows an example plot 300 illustrating the distribution of the plurality of FPs and their probability deviations 301 determined for the detected attack and the applied baseline 302. The example plot shows a PDF for the plurality of TLS FPs. The known FP portion includes $FP_1$ through $FP_3$, the unknown FP portion includes $FP_4$ through $FP_M$, and the unknown FP tail subset includes $FP_i$ through $FP_N$. In particular, the plot 300 shows a probability deviation (dashed line) 301 from the baseline probability (solid line) 302 for each of the FPs generating the attack. In the example plot 300 the unknown FPs in the unknown FP area and the unknown FP tail area do not include any notable baseline probabilities (solids lines) 302 compared to the known FP area. It should be noted that in other example scenarios, the unknown FP portion may also display baseline probabilities as the unknown FPs are also observed during peacetime when the baseline probability values are determined and recorded. In some implementations, the FPs of the unknown FP tail area may be grouped in a single bin in a distribution plot. In such a case, the probabilities may be averaged.

Returning back to FIG. 2, in an embodiment, the distribution of types of FPs (e.g., known FP, unknown FP, etc.) are utilized to characterize the detected TLS attack as, for example, a randomized attack or a non-randomized attack. The detected attack may have significant portions being generated by "random" TLS FPs at a wide range of FP values rather than a closed set of identifiable FP values. In such a scenario, the detected TLS attack may be characterized as randomized TLS attack.

As an example, the randomized attack may have a large number of unknown FPs that are greater than a predefined FP limit. In a further example, the predefined FP limit is 100, where TLS attacks with more than 100 different FP values classified as unknown FPs are characterized as a randomized TLS attack. It should be noted that attack FPs in the randomized TLS attack have low hits rate per each FP and are not recognized as deviating FPs with respect to the normal baseline. The total hits rate may still be high. The characterization of the detected attack as randomized and non-randomized, and further as, for example, an unknown FPs attack, a known FPs attack, and a mixed FPs attack, is performed based on the rate-based and rate-invariant parameters for the plurality of FPs in the detected attack. Attack classification or characterization may be used to define mitigation rules and policies, for example, blocking traffic associated with a unique FP. Further characterization of non-randomized attacks is described in detail herein below.

It should be noted that the rate-based and rate-invariant parameters of the plurality of FPs may be determined at the mitigation system (e.g., the mitigation system 108, FIG. 1), received from the detection system (e.g., the detection system 104, FIG. 1), or both. In some implementations, the operation may stop upon characterizing the detected TLS attack as the known attack, and mitigation is not performed.

At S230, it is checked whether the attack is characterized as a randomized attack. If so, the operation terminates. Otherwise, the operation continues with S240.

In some embodiments, the randomized attack may be mitigated using a positive recognition method upon characterization. The positive recognition method permits transactions originating from native FPs (i.e., known FPs) to the protected entity while blocking all other transactions that do not originate from the native FPs. The native FPs of the native FP baseline may be automatically learned during peacetime.

At S240, a real time signature (RTS) is generated according to the classification of the plurality of FPs. In an embodiment, anomalous FPs (or deviating FPs) generating the detected attack and classified as known or unknown FPs are analyzed to add a selected subset of FPs to the RTS. The anomalous FPs are derived by applying rate-based and/or rate-invariant parameter values of the normal baseline collected during peacetime traffic. The deviation of FPs showing behavior different from the peacetime traffic may be derived from both unknown FPs and known FPs of the plurality of FPs in the detected TLS attack. In an embodiment, the anomalous FPs (unknown FPs or known FPs) are identified based on the rate-based parameter values and a typical top FP value. In some implementations, the deviation is determined when the difference with respect to the normal baseline is greater than a predetermined threshold range.

In an embodiment, the RTS is generated to include non-native, anomalous fingerprints (i.e., unknown FPs) selected according to the method described in further detail below in FIGS. 4 and 5. The classified fingerprints and their real-time statistics are employed. It should be noted that the RTS is generated to prevent over-blocking of communications utilizing the TLS protocol. For example, the RTS for the detected attack is generated to allow communication from known FPs that are identified as trustable. The known FPs may be part of a native FP baseline and identified, for example, at S220.

In some implementations, a detected non-randomized TLS attack is characterized as one of, for example, an unknown FPs attack, a known FPs attack, and a mixed FPs attack based on the distribution of classified anomalous FPs. The detected attack may include unknown FPs only, known FPs only, or both types of FPs. The unknown FP attack and the known FP attack are generated mostly from unknown FPs and known FPs, respectively. The mixed FP attack includes traffic from both unknown and known FPs.

The unknown FP attack includes a large proportion of the unknown anomalous FPs, with respect to all anomalous FPs (unknown and known anomalous FPs) in the attack traffic. The large proportion may be defined as a number of rate-related values (e.g., FP hits rate, etc.) that is greater than a predefined proportion. In another example, the large proportion may be a percentage of 70% out of all anomalous FPs identified from the detected TLS attack. Similarly, the known FP attack includes a large proportion of the known anomalous FPs greater than the predefined proportion. As an example, the predefined proportion may be 80% of all anomalous FPs generating the detected attack. In an example embodiment, the mitigation action may not be executed upon characterizing the encrypted TLS attack as the known FPs attack. In another example embodiment, the rules and/or policies for RTS generation may differ based on the attack characterization.

At S250, the detected TLS attack is mitigated by executing mitigation actions on the FPs in the generated RTS. It should be noted that the generation of the RTS allows effective separation and identification of legitimate and malicious transactions during the attack time window, thereby facilitating the mitigation of malicious transactions over communications from legitimate sources. It should be further noted that mitigation may be performed on portions of the plurality of FPs generating the attack, thereby conserving computational power and memory in at least the mitigation system (e.g., the mitigation system 108, FIG. 1). According to the disclosed embodiments, the mitigation actions are performed on the encrypted TLS transactions without decryption, thereby avoiding complexity and challenges associated therewith. It should be further appreciated that the identification of target FPs in the RTS without decryption also reduces processing time and power, thereby conserving computational resources.

Non-limiting examples of mitigation actions may be, for example, applying a scrubbing center or a DDOS mitigation device, or the like. In another non-limiting example, the mitigation action may include limiting the rate of attacker traffic or reporting and logging the mitigation results without any actual blocking of the incoming request. In some implementations, the FPs of the RTS may be decrypted for other mitigation actions such as, but not limited to, blocking of a request, filtering transactions based on HTTP header parameters, redirecting transactions, and the like, and more.

In some implementations, feedback on the mitigation actions executed on the attack may be received. Upon receiving feedback on ineffective mitigation of the attack, the operation may return to S240 to regenerate and/or update the RTS for the attack. It should be noted that the characterization and mitigation processes may be repeatedly performed for the detected TLS attack to effectively remediate the encrypted DDOS attack. The method described in FIG. 3 may be performed for each of the detected attacks, changes in the attack characterization, and more for effective protection against encrypted TLS DDOS attacks.

In some other implementations, the native FP baseline may be updated to generate new native FP baselines using larger native threshold values. The larger native threshold values reduce the number of native FPs (thus, known FPs), and in return encompass a greater number of unknown FPs that may be added to the RTS as potential mitigation traffic. To this end, mitigation actions may be performed on FPs that were not previously in the RTS and not mitigated.

Figure 4:
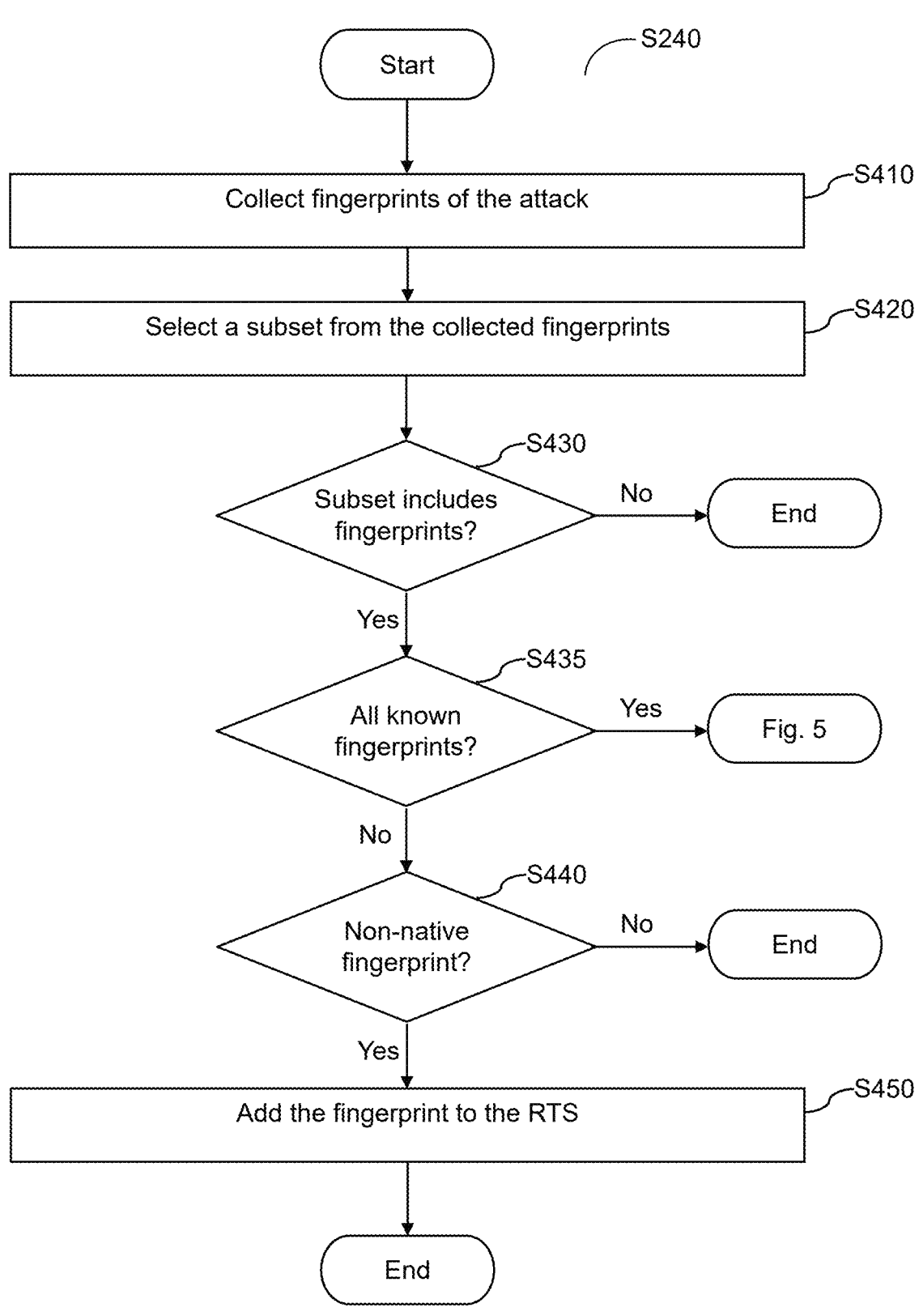
FIG. 4 is a flowchart illustrating a method for generating a real-time signature (RTS) for a detected attack according to an embodiment.

FIG. 4 is an example flowchart S240 illustrating a method for generating a real time signature (RTS) for the detected attack according to an embodiment. The method is performed on a mitigation system (e.g., the mitigation system 108, FIG. 1). In an embodiment, the RTS is generated for encrypted DDOS attacks that are characterized as a mixed FPs attack or an unknown FPs attack. In another embodiment, encrypted DDOS attacks that include one or more unknown FPs, classified in S310, FIG. 3, may utilize the disclosed method for RTS generation and mitigation.

At S410, fingerprints (FPs) associated with the detected attack are collected. The FPs including, for example, but not limited to, FP values, rate-based parameter values, rate-invariant parameter values, and the like, are collected as determined during the detection and characterization of the detected TLS attack.

At S420, a subset of anomalous FPs is selected from the collected FPs. In an embodiment, the FPs that deviate from the peacetime baseline and typical top rates are identified as anomalous FPs and selected as the subset. In an example embodiment, the deviations are determined based on rate-based parameter values, for example, but not limited to, counter values. Each FP with a rate-based value greater than the baseline rate-based value of the specific FP and the rate-based value greater than the typical top FPs rate (or typical top rate) value are selected and added to the subset. The typical top FPs rate value is defined as the top average and may be determined by taking the average of the top 10 rate-based values for FPs in the baseline. In a further example embodiment, FPs with FP hits values above the maximum are selected as the subset.

As noted above, the baseline of each FP and the top FPs rate may be determined during peacetime traffic and may be stored and retrieved from the database (e.g., the baseline DB 110, FIG. 1). The retrieved baseline may include, or be utilized to determine, the baseline rate-based values. In an embodiment, the baseline rate-based values (e.g., baseline rate-based value, typical top FPs rate value, etc.) for determining the deviation of the attack FPs may be adjusted according to the effective time of the baseline learning period (i.e., peacetime). The baseline rate-based value is multiplied by an alpha coefficient that defines an IIR filter averaging period. As an example, the alpha coefficient is 0.005 for a short learning period (e.g., about 1 hour) and 0.008 for a long learning period (e.g., about 7-8 hours). That is, an FP from the collected FPs is identified as an anomalous FP when its rate-based value is greater than the adjusted baseline rate-based value and the adjusted typical top FPs rate value.

At S430, it is checked whether the subset of selected FPs includes FPs. If not, and the subset is empty, the operation terminates. If the subset includes FPs that are selected in S420, the operation continues with S435.

At S435, it is checked whether the FPs are all classified as known FPs. If so, the operation continues with FIG. 5; otherwise, the operation continues with S440. FIG. 5 describes a method to generate an RTS for the known FPs and is further described herein below. The operation that continues with S440 prioritizes the unknown FPs for potential FP in the RTS.

At S440, it is checked whether selected FPs are non-native FPs that are not part of a native FP baseline (i.e., FPs labeled as 'unknown' FPs). If so, the operation continues with S450. Otherwise, the operation terminates and the FPs that are not non-native FPs (i.e., known FPs) are not added to the RTS.

The native FP baseline may be a PDF of native FPs with probabilities above the native threshold value. The native FPs are estimated to be frequently observed FPs at sufficiently high intensities (above the native threshold probability value) during peacetime and determined to be from trusted sources.

As noted above, the native FP baseline may be generated and updated in parallel with the process of FIG. 2 based on the stored baseline and a changed native threshold value. As an example, a new native FP baseline is generated with a lower native threshold value to include a greater number of FPs as part of the native FP baseline. That is, the number of native FPs may be increased by lowering the native threshold value for generating the new native FP baseline. In such a case, the number of FPs classified as known FPs, for example at S210, FIG. 2, is increased based on the new native FP baseline.

In some implementations, the native threshold value may be iteratively increased until the detected attack is effectively mitigated. The process of generating the RTS may be iteratively repeated using the larger native threshold value to include a greater number of FPs in the RTS, as targets for mitigation. An effective mitigation of the attack is declared, for example, when a blocking rate with all FPs in the RTS is equal to or higher than the attack rate. Here, the attack rate is determined by a subtraction of the baseline hello per second (HPS) rate from a total rate (i.e., total HPS rate) of the triggered attack. Hello per second (HPS) defines a rate at which a connection is initiated, for example, by a client entity sending a TLS "hello" message to the server.

In some implementations, an FP aging mechanism may be applied to manage the FPs of the baselines (e.g., normal baseline, native FP baseline, etc.). The baseline probabilities for the FPs are utilized to assign an aging value (or time) such as, but not limited to, 1 hour, 3 hour, 6 hour, 24 hour, or the like. As an example, a first FP with a high probability value is assigned a 24 hour aging value compared to a second FP with a low probability that is assigned with a 3 hour aging value. In the same example, the first FP (e.g., high PDF) remains in the system (and baselines) for 24 hours, whereas the second FP remains for 3 hours. The probability ranges and corresponding aging values may be predetermined and assigned accordingly. Such an aging mechanism allows effective management of the FPs to reduce keeping idle FPs and prevent potential memory allocation issues, for example, for maintaining current native FP baselines. To this end, current native FP baselines may be stored and implemented to reduce false positives, i.e., over-blocking of native FPs. As an example, without the FP aging mechanism, native FPs may not be stored and as a result, may be recognized as a non-native FP and blocked.

At S450, the non-native fingerprints are added to the RTS. The RTS includes at least one FP of the selected subset of anomalous unknown FPs that are determined in S420. In an embodiment, the FPs in the RTS are identified to be associated with malicious sources, and mitigation actions may be initiated on the RTS based on S260, FIG. 2. It should be noted that portions of the plurality of FPs generating the detected TLS attack are added to the RTS for mitigation using methods disclosed herein. Thus, targeted mitigation is effectively performed on the accurately identified malicious transactions. It should be further noted that the disclosed embodiments enable identification and mitigation of encrypted TLS traffic without decryption, thereby reducing processing time and power, while also preserving privacy in the communications.

It should be noted that steps S440 and S450 of checking and adding the FP to the RTS may be performed for each FP included in the subset of anomalous FPs and thus, the steps may be repeatedly performed for the FPs in the subset. FIG. 4 shows one flow for illustrative and simplicity and does not limit the scope of the disclosed embodiments.

Figure 5:
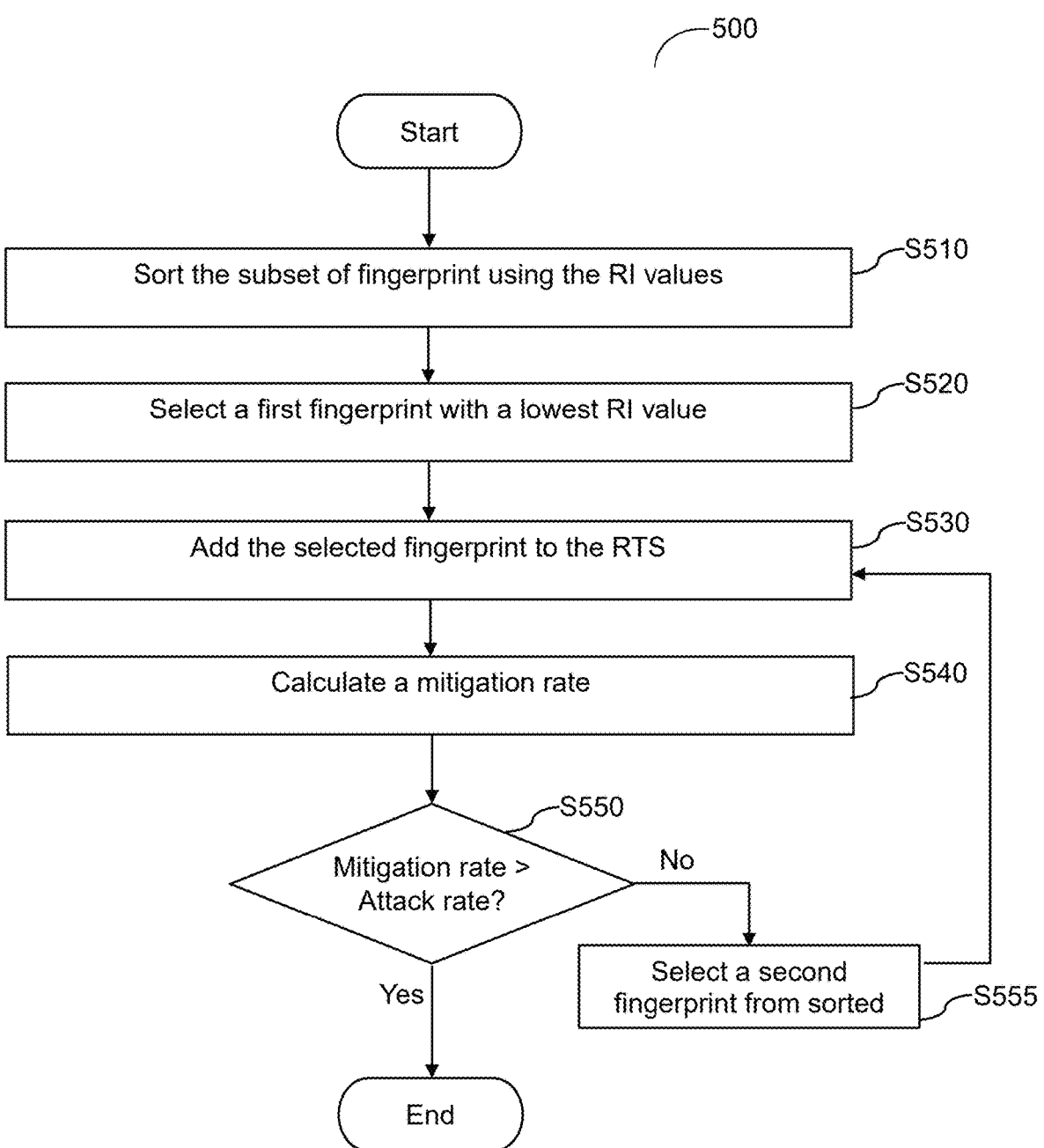
FIG. 5 is a flowchart illustrating a method for generating a real-time signature (RTS) for known fingerprints (FPs) according to an embodiment.

FIG. 5 is an example flowchart 500 illustrating a method for generating a real time signature (RTS) for known fingerprints (FPs) according to an embodiment. The method is performed on a mitigation system (e.g., the mitigation system 108, FIG. 1). The method of generating the RTS described in FIG. 5 continues from S435, FIG. 4 upon determination that the FPs are all classified as known FPs.

In some implementations, the method of FIG. 5 may be performed for mixed FPs attack to add known FPs in the mixed FPs attack to the RTS. For example, the method is triggered upon determination that the mitigations using RTS of unknown FPs are ineffective. That is, the method of FIG. 5 is performed after the RTS generation outlined in FIG. 4. In some implementations, the method may be performed upon detecting a high percentage of known FPs, for example, and without limitation, 80% or greater, from all anomalous FPs of the detected TLS attack. The updated RTS including known FPs determined according to the disclosed embodiments minimizes false positives (i.e., blocking the fewest legitimate transactions) while effectively remediating the detected attack.

At S510, the FPs in the selected subset are sorted based on the rate-invariant (RI) baseline values. The selected subset of FPs, as selected in S420, FIG. 4, includes FPs identified as anomalous FPs. The subset is a selected portion of at least one FP from the plurality of FPs generating the detected attack. The RI baseline values may include the probability distribution function (PDF) values. In an embodiment, the RI baseline values for the collected FPs are sorted in an ascending order from lowest to highest value. That is, the collected FPs are organized by their probability of appearance based on a RI baseline calculated during peacetime traffic. In an embodiment, the collected FP are organized from lowest to highest probability of appearance. The sorting and selection of the lowest RI baseline value enables minimizing potential false positives of legitimate traffic.

At S520, a first FP with the lowest RI value is selected. As an example, the first FP is a known FP in the TLS attack that has the lowest frequency or probability of appearance (i.e., lowest probability value) in the baseline.

At S530, the selected FP is added to the RTS. The RTS includes at least one FP out of the plurality of known anomalous FPs generating the detected attack.

At S540, a mitigation rate is calculated for the FPs within the RTS. The mitigation rate is the sum of the rates of the FP values (FPi_Rate) of the FPs in the RTS. In an example embodiment, when the RTS includes only the first FP, the mitigation rate is determined using only the first FP. In a further example embodiment, when second FPs are selected and added with repeated loop operation of S530 through S555, the mitigation rate is determined with respect to the first FP and the second FPs added to the RTS.

$$\text{Mitigation rate} = \sum_{i=1}^{n} FPi\_Rate$$

At S550, it is checked whether the mitigation rate is greater than an attack rate. If so, the operation terminates and the added FPs in the generated RTS are utilized for mitigation at S250, FIG. 2. If not, the operation continues with S555 to select a second FP from the sorted list of S510. The attack rate is the rate within a time window in which the attack was triggered. As noted above, the attack rate may be determined as a difference between the total rate and the baseline HPS. Hello per second (HPS) defines a rate at which a connection is initiated, for example, by a client entity by sending a TLS "hello" message to the server. The second FP from the sorted list has the next lowest RI value after the first FP in the sorted list.

The operation returns to S530 to add the selected second FP to the RTS. Steps of S540 and S550 are repeated using the FPs added to the RTS. As an example, the mitigation rate is calculated using the first FP and the second FP when the operation returns once from S550 to S530. In a further example, the mitigation rate is determined using the first FP and k number (wherein the k is an integer greater than 1) of different second FPs when the operation returns k times from S550 to S530. In this example, the RTS includes the first FP and k different second FPs that were added at S555 at the k iterations of the loop process.

According to the disclosed embodiments, the RTS generated, according to the TLS attack classifications and disclosed methods of FIGS. 4 and 5, is utilized to mitigate the detected attack. Here, the anomalous FPs in the RTS, which are accurately selected from the plurality of FPs in the attack, are the targets for mitigation actions.

Figure 6:
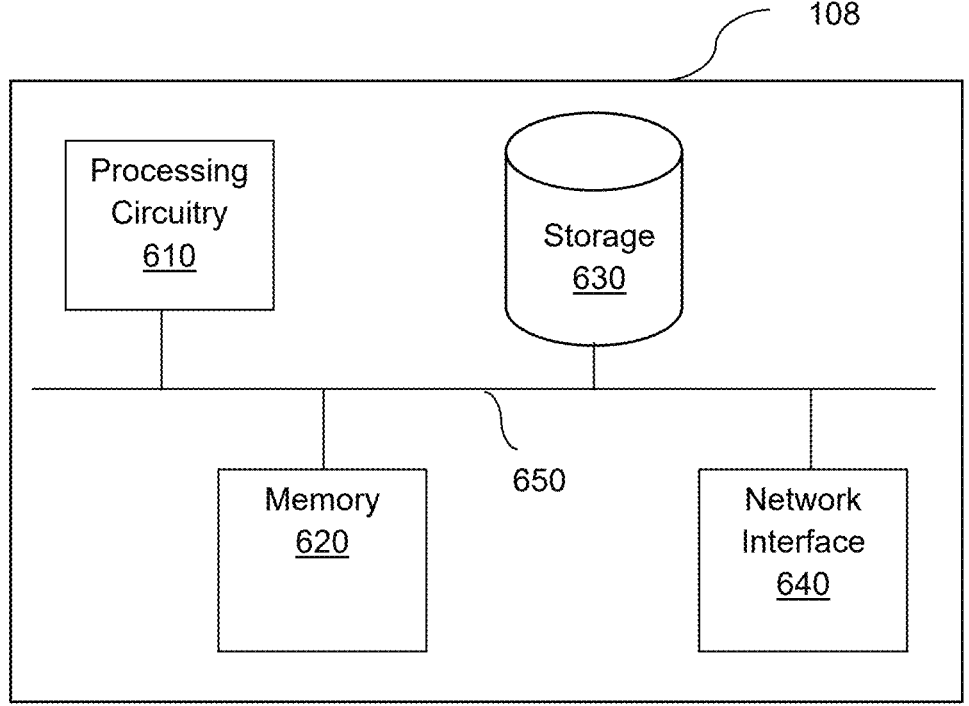
FIG. 6 is a schematic diagram of a mitigation system according to an embodiment.

FIG. 6 is an example block diagram of a hardware layer depicting a mitigation system 108, according to an embodiment. The mitigation system 108 may be a compute node or a network node and includes a processing circuitry 610 coupled to a memory 620, a storage 630, and a network interface 640. In an embodiment, the components of the verification system may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof.

In one configuration, software for implementing one or more embodiments disclosed herein may be stored in storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 640 allows the mitigation system 108 to communicate with the various components, devices, and systems described herein for production code static analysis, as well as other like purposes. The network interface 640 can be a port of the network node.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to and executed by a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating encrypted distributed denial of service (DDOS) attacks, comprising:

receiving a detection of an encrypted DDOS attack from an encrypted transaction related traffic, wherein the encrypted DDOS attack is associated with a plurality of transport layer security (TLS) fingerprints (FPs);

classifying each of the plurality of TLS FPs as a type of FP based on a comparison of rate-invariant values to a native FP baseline, wherein the rate-invariant values are associated with the plurality of TLS FPs;

selecting anomalous FPs as a subset of the plurality of TLS FPs;

generating a real time signature (RTS), for the encrypted DDOS attack, having at least one unknown type of FP of the subset of anomalous FPs; and mitigating the encrypted DDOS attack based on the generated RTS.

2. The method of claim 1, further comprising:

comparing rate-based values of the plurality of TLS FPs to a peacetime baseline and a typical top rate, wherein the peacetime baseline provides rate-based values and rate invariant parameters of FPs observed in a peacetime; and identifying the anomalous FPs based on the comparison.

3. The method of claim 2, wherein the typical top rate is an average of top ten rate-based values of the peacetime baseline, wherein the rate-based values are any one of: a FP hits rate, a total FP hits, a FP load rate, and a total FP load towards a protected entity.

4. The method of claim 1, wherein each of the plurality of TLS FPs missing in the native FP baseline is classified as the unknown type of FP.

5. The method of claim 1, wherein the native FP baseline has native FPs observed during a peacetime, wherein the native FPs have rate-invariant values greater than a native probability threshold.

6. The method of claim 5, further comprising:

increasing the native probability threshold to be a greater native probability threshold;

generating a changed native FP baseline using the greater native probability threshold; and classifying the anomalous FPs as the unknown type of FP, wherein a rate-invariant value of the anomalous FP is below the greater native probability threshold.

7. The method of claim 1, further comprising:

characterizing the encrypted DDOS attack as a randomized attack based on proportions of classified types of FP in the plurality of TLS FPs; and mitigating a portion of the plurality of TLS FPs that are classified as the unknown type of FPs.

8. The method of claim 1, wherein the plurality of TLS FPs is classified as known type of FPs, further comprising:

sorting the anomalous FPs of the subset based on rate-invariant values of the anomalous FPs;

selecting a first FP from the subset, wherein the first FP has a lowest rate-invariant value from the sorted anomalous FPs in the subset; and adding the first FP to the RTS.

9. The method of claim 8, further comprising:

calculating an attack rate for the encrypted DDOS attack and a mitigation rate for the FPs in the RTS based on a sum of rate-based values of FP values;

adding a second FP from the subset to the RTS, wherein the second FP has a next lowest rate-invariant from the sorted anomalous FPs in the subset; and iteratively repeating the calculating and the adding a second FP from the subset to the RTS until the mitigation rate is greater than the attack rate.

10. The method of claim 1, where the mitigating is targeted on FPs in the generated RTS.

11. A non-transitory computer-readable medium having stored thereon instructions for causing a processing circuitry to execute a process, the process comprising:

receiving a detection of an encrypted DDOS attack from an encrypted transaction related traffic, wherein the encrypted DDOS attack is associated with a plurality of transport layer security (TLS) fingerprints (FPs);

classifying each of the plurality of TLS FPs as a type of FP based on a comparison of rate-invariant values to a native FP baseline, wherein the rate-invariant values are associated with the plurality of TLS FPs;

selecting anomalous FPs as a subset of the plurality of TLS FPs;

generating a real time signature (RTS), for the encrypted DDOS attack, having at least one unknown type of FP of the subset of anomalous FPs; and mitigating the encrypted DDOS attack based on the generated RTS.

12. A system for mitigating encrypted distributed denial of service (DDOS) attacks comprising:

a processing circuitry; and a memory, the memory containing instructions that, when executed by the processing circuitry, configure the system to:

receive a detection of an encrypted DDOS attack from an encrypted transaction related traffic, wherein the encrypted DDOS attack is associated with a plurality of transport layer security (TLS) fingerprints (FPs);

classify each of the plurality of TLS FPs as a type of FP based on a comparison of rate-invariant values to a native FP baseline, wherein the rate-invariant values are associated with the plurality of TLS FPs;

select anomalous FPs as a subset of the plurality of TLS FPs;

generate a real time signature (RTS), for the encrypted DDOS attack, having at least one unknown type of FP of the subset of anomalous FPs; and mitigate the encrypted DDOS attack based on the generated RTS.

13. The system of claim 12, wherein the system is further configured to:

compare rate-based values of the plurality of TLS FPs to a peacetime baseline and a typical top rate, wherein the peacetime baseline provides rate-based values and rate invariant parameters of FPs observed in a peacetime; and identify the anomalous FPs based on the comparison.

14. The system of claim 13, wherein the typical top rate is an average of top ten rate-based values of the peacetime baseline, wherein the rate-based values are any one of: a FP hits rate, a total FP hits, a FP load rate, and a total FP load towards a protected entity.

15. The system of claim 12, wherein each of the plurality of TLS FPs missing in the native FP baseline is classified as the unknown type of FP.

16. The system of claim 12, wherein the native FP baseline has native FPs observed during a peacetime, wherein the native FPs have rate-invariant values greater than a native probability threshold.

17. The system of claim 16, wherein the system is further configured to:

increase the native probability threshold to be a greater native probability threshold;

generate a changed native FP baseline using the greater native probability threshold; and classify the anomalous FPs as the unknown type of FP, wherein a rate-invariant value of the anomalous FP is below the greater native probability threshold.

18. The system of claim 12, wherein the system is further configured to:

characterize the encrypted DDOS attack as a randomized attack based on proportions of classified types of FP in the plurality of TLS FPs; and mitigate a portion of the plurality of TLS FPs that are classified as the unknown type of FPs.

19. The system of claim 12, wherein the system is further configured to, wherein the plurality of TLS FPs is classified as known type of FPs:

sort the anomalous FPs of the subset based on rate-invariant values of the anomalous FPs;

select a first FP from the subset, wherein the first FP has a lowest rate-invariant value from the sorted anomalous FPs in the subset; and add the first FP to the RTS.

20. The system of claim 19, wherein the system is further configured to:

calculate an attack rate for the encrypted DDOS attack and a mitigation rate for the FPs in the RTS based on a sum of rate-based values of FP values;

add a second FP from the subset to the RTS, wherein the second FP has a next lowest rate-invariant from the sorted anomalous FPs in the subset; and iteratively repeat the calculating and the adding a second FP from the subset to the RTS until the mitigation rate is greater than the attack rate.

\*    \*    \*    \*    \*